Oct. 2, 1962 B. A. PROCTOR 3,056,302

RECORDING HEAD CARRIAGE CONTROL

Original Filed Feb. 25, 1953 5 Sheets-Sheet 1

INVENTOR.
BARTON A. PROCTOR
BY
Nolte, & Nolte
ATTORNEYS

RECORDING HEAD CARRIAGE CONTROL

Original Filed Feb. 25, 1953 5 Sheets-Sheet 2

INVENTOR.
BARTON A. PROCTOR
BY
Nolte & Nolte
ATTORNEYS

INVENTOR.
BARTON A. PROCTOR
BY
Nolte & Nolte
ATTORNEYS

Oct. 2, 1962 B. A. PROCTOR 3,056,302

RECORDING HEAD CARRIAGE CONTROL

Original Filed Feb. 25, 1953 5 Sheets-Sheet 4

INVENTOR.
BARTON A. PROCTOR
BY

Nolte & Nolte
ATTORNEYS

INVENTOR.
BARTON A. PROCTOR
BY
Nolte & Nolte
ATTORNEYS

United States Patent Office 3,056,302

Patented Oct. 2, 1962

3,056,302

RECORDING HEAD CARRIAGE CONTROL

Barton A. Proctor, Larchmont, N.Y., assignor, by direct and mesne assignments, to Proctor Dictating Machine Corporation, New York, N.Y., a corporation of New York Original application Feb. 25, 1953, Ser. No. 338,777. Divided and this application Mar. 7, 1960, Ser. No. 16,904
6 Claims. (Cl. 74—2)

The present invention relates to sound recording and reproducing apparatus, and more particularly to devices of this character which are suitable for use in aircraft or other vehicles or in offices or other stationary locations. This type of service requires a device which provides compactness, light weight, and resistance both to vibration, and to extreme variations both in temperature and in atmospheric pressure.

The present invention is a division of my co-pending patent application Serial No. 338,777, filed February 25, 1953 now Patent No. 2,933,319.

Many of the features of the present invention, although herein illustratively shown and described as applied to sound recording and reproducing apparatus utilizing a magnetizable and demagnetizable recording medium in tape or strip form, may be also applied to any sound recording and reproduction device utilizing a recording medium in strip form, including photoelectric devices which utilize photographic film in strip form, and devices which utilize a flexible strip form recording medium adapted to have a signal mechanically recorded thereon by a stylus which forms a groove extending longitudinally along the strip.

An object of the invention is to provide a magnetic recording and reproducing machine which utilizes a recording medium having a predetermined number of spaced parallel recording areas extending longitudinally thereof.

A further object of the invention is the provision of a recording and reproducing device of this character which comprises transducing means movable transversely with respect to the recording medium, and means for moving the transversely spaced longitudinal recording areas of the recording medium for operative engagement with the transducing means, the selecting means cooperating with directional control means so that the direction of travel of the recording medium is always the same for any known longitudinal area of the tape-form recording medium.

A further object of the invention is the provision of both manually and electrically actuatable means for selecting any one of the longitudinal recording areas for recording signals or for the reproduction of previously recorded signals.

Still another object of the invention is the provision of electromagnetic control means for selecting any desired recording area, which control means are normally disengaged, thereby preventing interference with manually operable control means, the manually operable control means being so arranged that no improper manipulation thereof may damage the control mechanism.

Another object of the invention is the provision of means for the actuation of a remote indicator for the purpose of indicating the longitudinal portion of the recording medium and the particular recording area thereof which is in operative engagement with the transducing means.

Other and further objects will become apparent upon reading the following specification, together with the accompanying drawing forming a part hereof.

Referring to the drawing.

The magnetic tape, in the embodiment of the invention herein illustrated, is provided with eight vertically spaced longitudinally extending horizontal recording areas, whose center lines may be individually selectively engaged by the recording heads 216 and 219, respectively.

Figure 16:
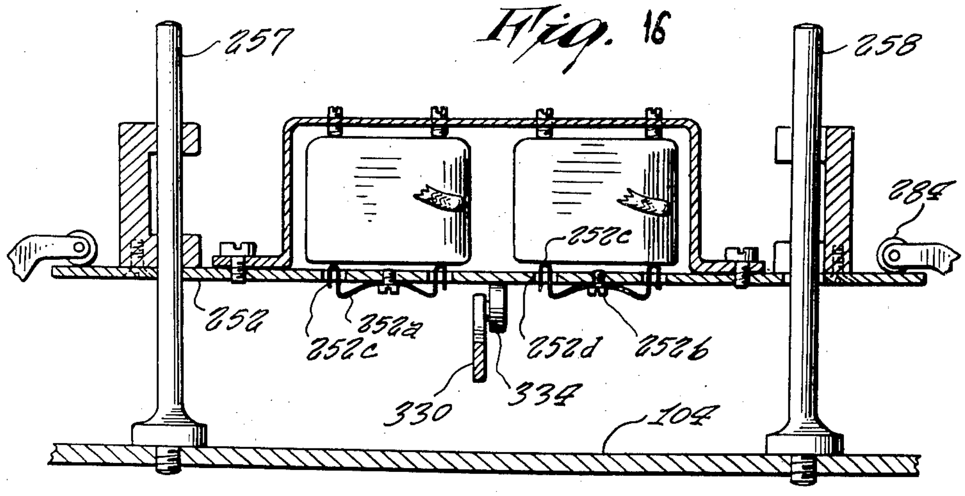
FIGURE 16 is an enlarged elevational view, partly in section, taken along the line 42—42 of FIGURE 2, showing the recording head carriage.

The recording heads 216 and 219 are adjustably mounted on a transversely extending recording carriage floor member 252, being secured by a strap 253 which is held at its ends by screws 254 threaded into carriage floor member 252. A group of four adjusting screws 253*a* (FIG. 2) is arranged above each of the recording heads 216 and 219. The recording heads 216 and 219 are each supported by and press downwardly on a resilient supporting member 252*a* (FIG. 16) which is secured to the underside of recording head carriage floor member 252 by a screw 252*b*. The bent back ends 252*c* of each resilient supporting member 252*a* extend upwardly through slots formed in carriage floor member 252 and engage the lower surfaces of the recording heads 216 and 219. By suitable adjustment of the screws 253*a*, the recording caps may be aligned with the center lines of the vertically spaced recording areas on the magnetic tape. The four adjusting screws 253*a* permit each entire recording head to be vertically displaced as a unit, and to be tilted in any desired direction with respect to a horizontal plane. Flexible cords 255 (FIG. 2) connect the recording heads 216 and 219 to the electrical circuits of the recording device.

The recording head carriage, designated generally as 256 (FIG. 2), is vertically slidable, being guided by upright posts 257 and 258 fixed to the upper side of main apparatus mounting plate 104. The carriage 256 comprises a C-shaped block 259 with vertically spaced horizontally extending arm portions 260 and 261, the arms 260 and 261 having vertically aligned apertures formed therein for sliding engagement with upright guide post 257. The C-shaped block 259 is fixed to carriage floor member 252 near one end thereof. Fixed to carriage floor member 252 near its opposite end, is another C-shaped block 262 with vertically spaced arm portions 263 and 264 having vertically aligned slots formed therein for sliding engagement with upright guide post 258. The slots in arm portions 263 and 264 of block 262 permit longitudinal expansion and contraction of carriage floor member 252 due to variations in ambient temperature without danger of causing the carriage to bind or otherwise prevent free vertical sliding movement along upright guide posts 257 and 258.

C-shaped block 259 carries a rearwardly projecting pin 265 and C-shaped block 262 carries a similar rearwardly projecting pin 266.

A pair of step members 267 and 268 (FIG. 3) are disposed behind recording carriage 256 and have flat bottom edges which rest on rollers 269 mounted in brackets 270 secured to main apparatus mounting plate 104. By sliding movement of the step members 267 and 268 on their supporting rollers 269, the pin 265 extending from C-shaped block 259 may be selectively positioned to rest on any of the horizontal step surfaces 271 of step member 267. Similarly, the pin 266 projecting from C-shaped block 262 may be selectively positioned to rest on any of the horizontal step surfaces 272 of the step member 268.

The step members 267 and 268 are held in fixed spaced relationship by a recording carriage control bar 273, being secured thereto by screws 273*a*. The spacing between the vertical step surfaces 274 of step member 267 and the vertical step surfaces of step member 268 is the same as the spacing between the centers of the pins 265 and 266 which project rearwardly from carriage 256. The levels of the horizontal step surfaces 271 and 272 of step members 267 and 268, respectively, are the same for each step where their corresponding vertical surfaces are positioned for engagement with the pins 265 and 266. In this manner, by moving carriage control bar 273 to the left as viewed in FIGURE 3, the carriage 256 will be permitted to drop successively from step to step, being supported at each position by engagement with the pins 265 and 266 with the horizontal step surfaces 271 and 272, respectively, of step members 267 and 268.

The vertical spacing of the horizontal step surfaces 271 and 272 corresponds with the vertical spacing between the center lines of the recording areas on the magnetic tape. Accordingly, eight steps are provided on each of the step members 267 and 268 and with two projecting pins 265 and 266 resting on corresponding steps of each step member, the recording heads will be aligned with the center of the corresponding one of recording areas on the recording tape.

An indicator pointer 275 is carried by carriage control bar 273 and cooperates with a fixed scale 276 marked on an index plate 277. Index pointer 275 indicates in conjunction with scale 276 the longitudinal position of carriage control bar 273, and hence indicates which of the horizontal step surfaces 271 and 272 of step members 267 and 268, respectively, is in engagement with pins 265 and 266. It is thus always possible to determine which one of the eight recording areas of a magnetic tape is in active engagement with the recording heads 216 and 219.

Figure 1:
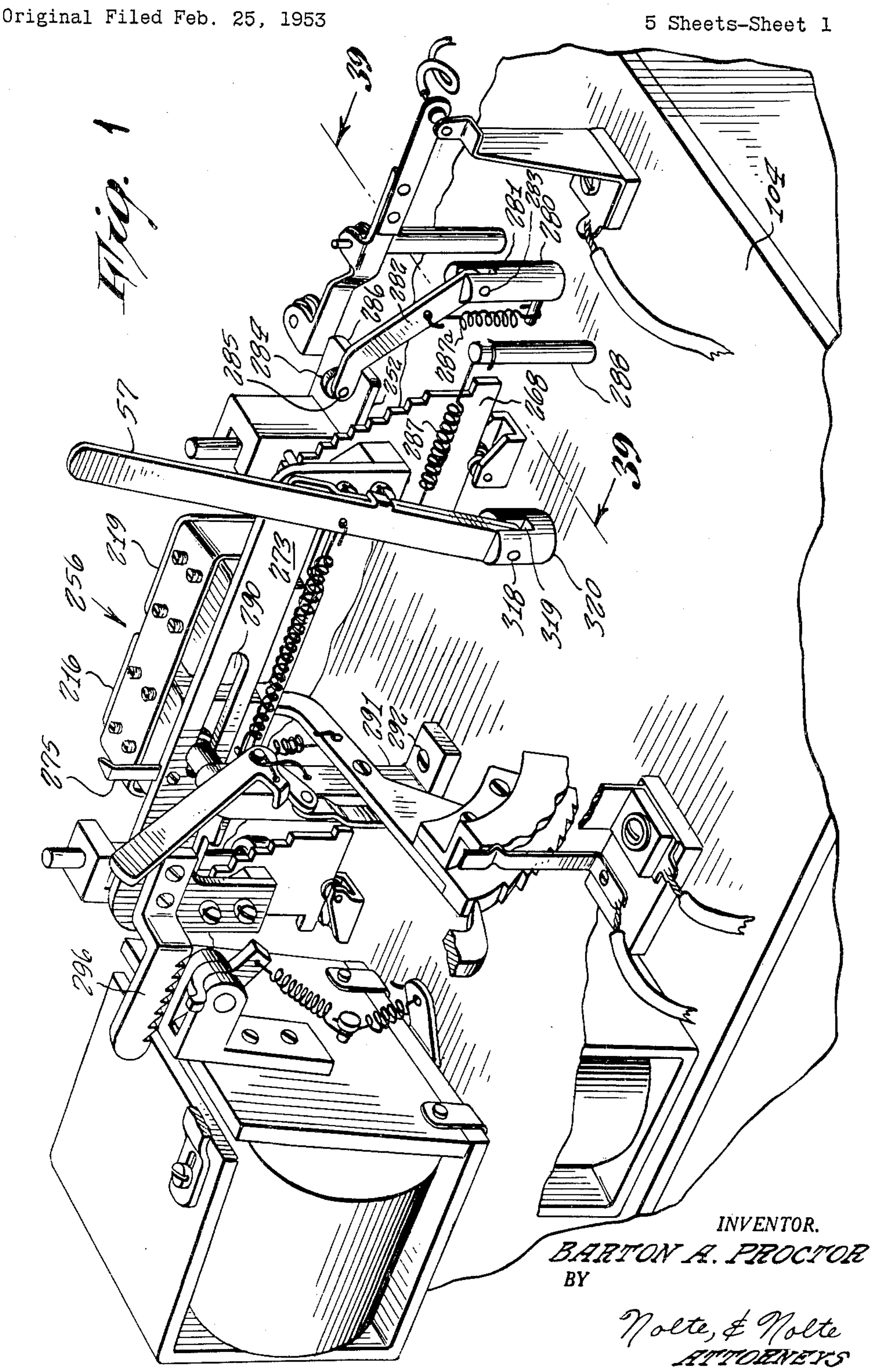
FIGURE 1 is a fragmentary rear perspective view showing the manual and electromagnetic mechanism for lowering the recording heads successively from one recording area to the next.

A pair of symmetrically arranged upright posts 280, one of which may be seen in FIGURE 1, are disposed in proximity to the ends of recording head carriage 256, the posts 280 being secured to the upper side of main apparatus mounting plate 104. The upper ends of posts 280 are slotted as indicated at 281. A pair of arms 282 are pivoted at their ends in slots 281 by pivot pins 283. Each of the two arms 282 carries a roller 284 mounted adjacent to its free end on a pin 285. The rollers 284 bear downwardly on the upper surfaces 286 of projecting end portions of carriage floor member 252. The rollers 284 are yieldingly pressed into engagement with the upper surfaces 286, by helical tension spring 287*a*. The carriage 256 is thus lowered by one step each time that the carriage control bar is moved to the left as viewed in FIGURE 1 through a distance equal to the width of the one of the horizontal step surfaces 271 and 272, being urged downwardly by the spring pressed rollers 284. A helical tension spring 287 has one end secured to an upright post 288 and the other end secured to a pivoted lever 321 (FIG. 4) described below. The tension spring 287 acting through lever 321, urges carriage control bar 273 to the right as viewed in FIGURE 1, thereby pressing the vertical sides 274 and 275 of the steps of step members 267 and 268, respectively, into engagement with the left hand sides of projecting pins 265 and 266, respectively, of carriage 256. The projecting pins 265 and 266 of recording head carriage 256 are thus held by tension spring 287 and spring pressed rollers 284 in engagement both with the vertical sides 274 and 275 and with the horizontal surfaces 271 and 272 of a selected one of the steps of step members 267 and 268, respectively, positioning the recording heads in operative engagement with one of the corresponding vertically spaced recording areas on the magnetic tape.

Figures 2, 3, 4:
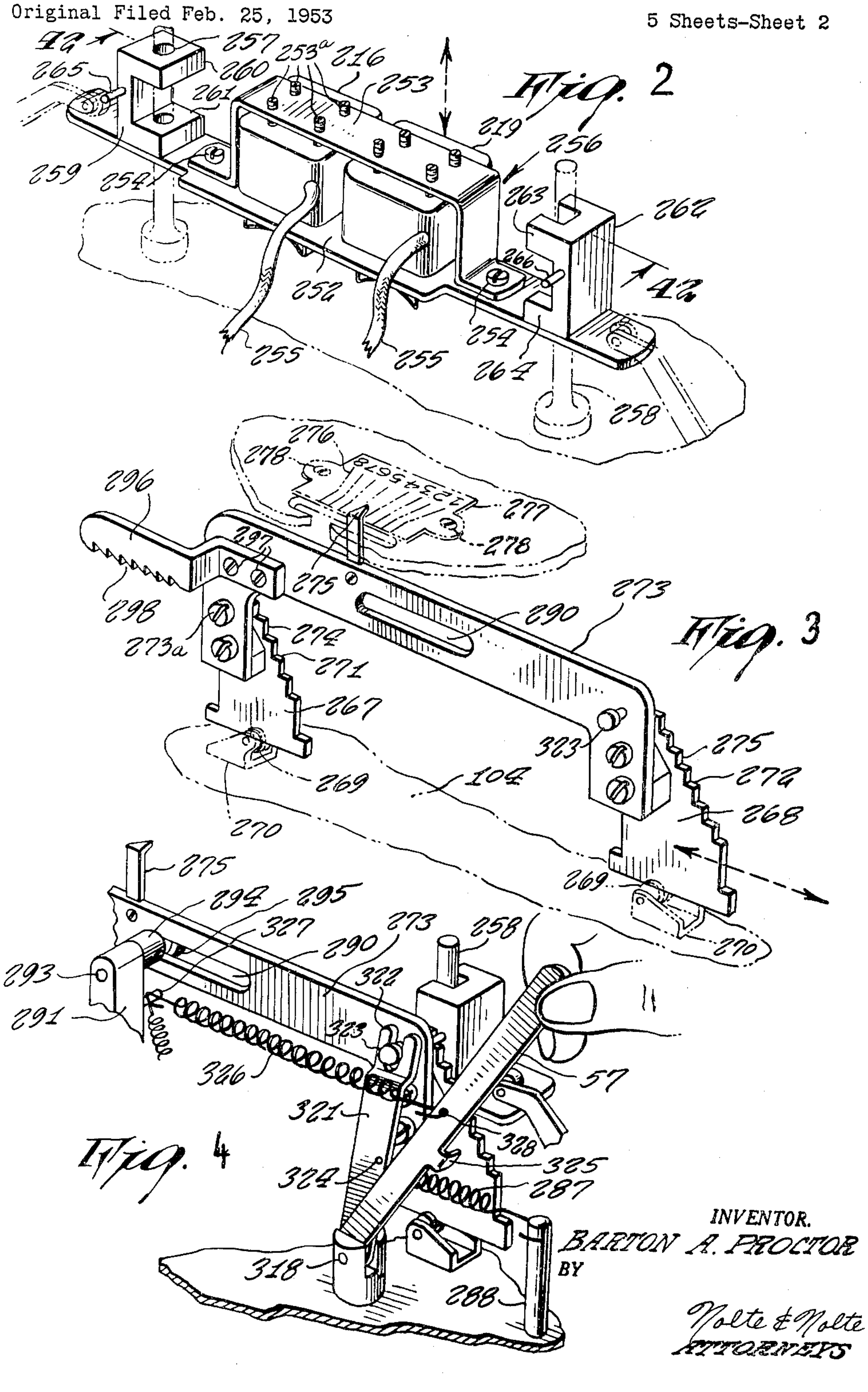
FIGURE 2 is a rear perspective view of a detail showing the recording heads mounted on a vertically movable carriage.
FIGURE 3 is a rear perspective view of a position control slide member for vertically positioning the recording head carriage.
FIGURE 4 is a rear perspective view illustrating how damage to the apparatus by improper manipulation of the manual line control lever is prevented.

Carriage control bar 273 has a longitudinal slot 290 formed therein near its center. An upright bracket 291 is secured to the upper side of main apparatus mounting plate 104 and at its upper end it carries forwardly projecting pin 293 (FIG. 4). Pin 293 projects through slot 290 in carriage control bar 273 and has freely rotatably mounted thereon, on opposite sides of control bar 273, spaced guide rollers 294 and 295 which engage the upper and lower surfaces of slot 290 as well as lateral surfaces of control bar 273 adjacent to the edges of slot 290. Control bar 273 is thus guided for longitudinal movement, the lower surfaces of step members 267 and 268 being supported by rollers 269 as described above.

Mechanism is provided for the lateral displacement of control bars 273 to the left, thereby lowering recording head carriage 256 by one line or more at a time. The lowering mechanism comprises both manually and electromagnetically actuated portions.

Figures 8, 9, 10, 11, 12, 13:
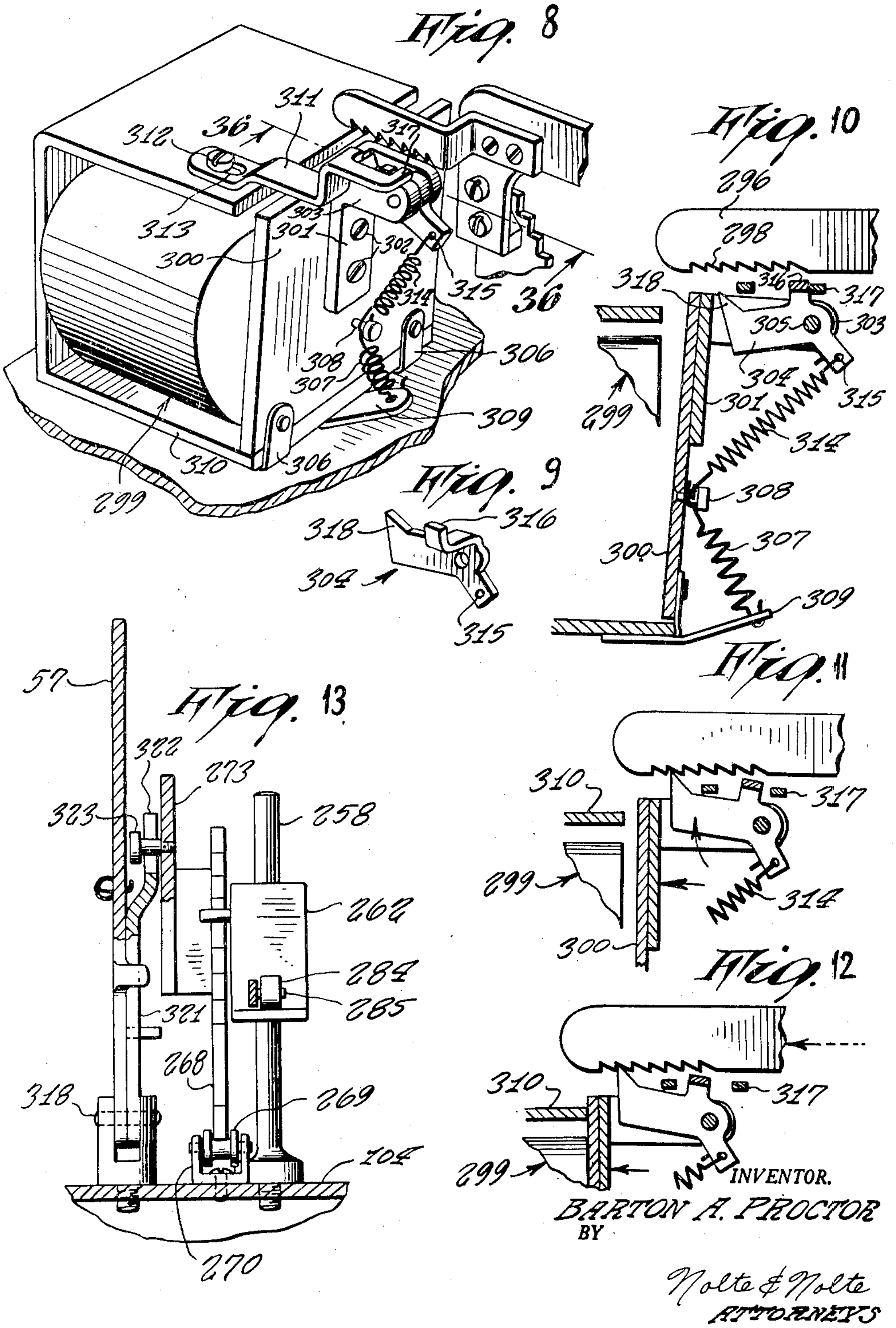
FIGURE 8 is a fragmentary perspective view showing a detail of electromagnetically actuated mechanism for lowering the recording head carriage.
FIGURE 9 is a perspective view of a detail, showing a pawl member used in FIGURE 8.
FIGURE 10 is a fragmentary view, partly in sectional elevation, taken along the line 36—36 of FIGURE 8, showing the recording carriage lowering mechanism of FIGURE 8, with the electromagnet in inactive position.
FIGURE 11 is a fragmentary view similar to FIGURE 10, showing the electromagnet in partially actuated position.
FIGURE 12 is a fragmentary view similar to FIGURE 10 with the electromagnet in fully actuated position.
FIGURE 13 is an enlarged view in elevation, partly in section, taken along the line 39—39 of FIGURE 1, looking in the direction of the arrows.

The electromagnetic mechanism for lowering recording head carriage 256 comprises a serrated rack member 296 (FIGS. 1, 3 and 8) secured to the left hand end of control bar 273 by screws 297. The lower surface of rack member 296 has downwardly directed ratchet teeth 298 formed therein. A carriage lowering electromagnet 299 (FIG. 8) is provided with a clapper type armature 300 which carries a bracket 301 near its upper end secured thereto by screws 302. Bracket 301 is provided with a pair of spaced outwardly projecting ears 303 and a pawl 304 is pivoted therebetween on a pin 305 (FIG. 9). Armature 300 is pivoted near its lower edge to electromagnet 299 by hinges 306. A helical retractile tension spring 307 has its ends connected between a pin 308 carried by armature 300 and a projecting lug 309 fixed to the frame 310 of electromagnet 299. Armature 300 is thus urged outwardly away from electromagnet 299 by the action of retractile spring 307.

A bracket 311 is adjustably secured to the upper side of the electromagnet 310 by a screw 312 which passes through an elongated slot 313 in bracket 311. A helical tension spring is connected at one end through a hole 315 formed in a projection of pawl 304 to rotate it in a clockwise direction on pivot pin 305 as viewed in FIGURE 10. With the armature 300 in its retracted position as shown in FIGURE 10, this rotation is prevented by an upwardly and laterally extending arm portion 316 of pawl 304 which engages a fixed projection 317 of bracket 311.

Upon energization of electromagnet 299, armature 300 is attracted and moves through an intermediate position shown in FIGURE 11 into its fully actuated position shown in FIGURE 12. As it moves toward its fully actuated position arm 316 of pawl 304 becomes disengaged from projection 317 of bracket 311, thereby permitting pawl 304 to rotate in a clockwise direction on its pivot pin 305. In so rotating, its free pointed end 318 moves upwardly and into engagement with one of the downwardly directed ratchet teeth 298 of rack member 296, and in its continued movement into its fully actuated position shown in FIGURE 12, moves the rack member and carriage control bar 273 to the left by a distance slightly greater than the spacing between adjacent teeth 298 of rack member 296, this spacing being equal the width of the horizontal surfaces 271 and 272 of step members 267 and 268. This movement of carriage control bar 273 to the left, allows the projecting pins 265 and 266 of recording head carriage 256 to drop to the next lower, thereby bringing the recording heads 216 and 219 into operative engagement with the next lower recording area of magnetic tape.

The recording carriage may also be independently lowered by manually operable means. The manually operable recording head carriage lowering lever 57 is pivoted at its lower end to a pivot pin 318 (FIG. 1) which traverses a slot 319 formed in the upper end of a short upright post 320. A lever 321 has its lower end similarly pivoted to pin 318 and its bifurcated upper end 322 (FIG. 4) embraces a headed pin 323 fixed to carriage control bar 273.

Lever 321 is urged to rotate in a clockwise direction as viewed in FIGURE 4, by the tension spring 287 which has one end secured to upright post 288, the other end passing through a hole 324 formed at one side of lever 321. Then tension spring 287 acting on hole 324 thus urges the bifurcated end 322 of lever 321 to the right, as viewed in FIGURE 4, and the headed pin 323 fixed to control bar 273 is urged to the right by its engagement with bifurcated end 322 of lever 321. This, in turn, urges control bar 273 and the step members 267 and 268 secured thereto to the right, as described above.

Manually operable lever 57 has a forwardly projecting lug 325 formed at the right side thereof, and lug 325 will engage lever 321, forcing it to the left against the yielding action of tension spring 287 when lever 57 is moved by hand in a counterclockwise direction, as viewed in FIGURE 4. A helical tension spring 326 has one end connected to a fixed pin 327 carried by upright bracket 291, the other end of tension spring 326 passing through a hole 329 formed at the left side of manually operable lever 57. Lug 325 thus normally engages lever 321, and lever 321 may be rotated in a counterclockwise direction about pivot pin 318 by moving the upper end of lever 57 to the left. Movement of lever 57 to the left displaces control bar 273 to the left allowing recording head carriage 256 to drop down one or more steps or recording lines according to the amount of such leftward displacement. Movement of manual control lever to the right, however, would tend to force one of the vertical sides 274 and 275 of step members 267 and 268 into engagement with projecting pins 265 and 266 of carriage 256. Application of sufficient force in this direction would tend to bend pins 265 and 266, or otherwise damage the apparatus. Such damage is prevented, however, because movement of manually operable lever 57 to the right, merely disengages lug 325 from the right hand side of lever 321 so that no force may be manually applied to projecting pins 265 and 266 of carriage 256.

Mechanism is also provided for elevating recording head carriage 256 one line or more at a time. The elevating mechanism comprises both manually and electromagnetically actuated portions.

Figures 5, 6, 7:
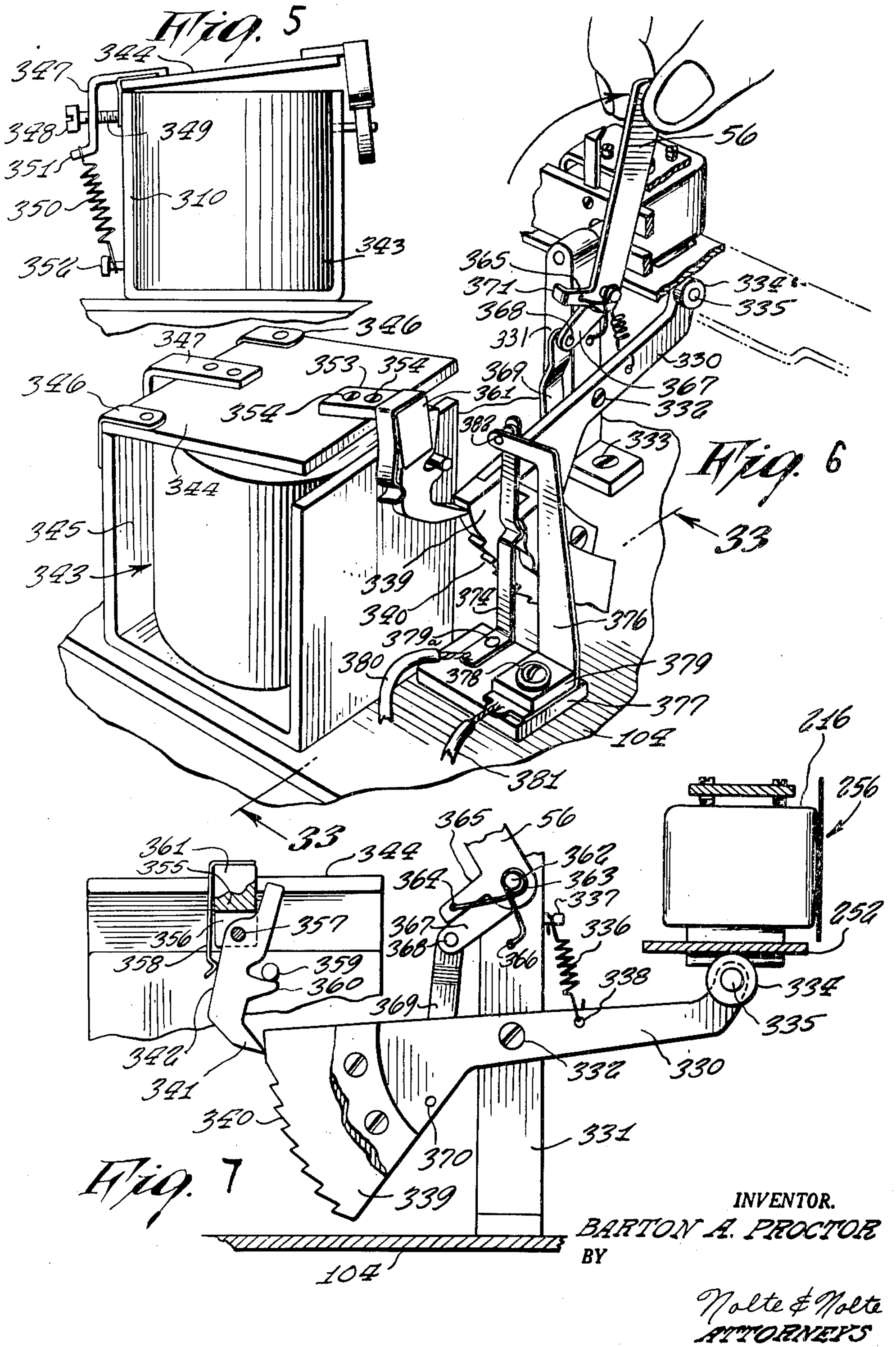
FIGURE 5 is a side view of an electromagnet for elevating the recording head carriage.
FIGURE 6 is a fragmentary perspective view showing the manually operable and electromagnetically actuated devices for elevating the recording head carriage.
FIGURE 7 is a side view taken along the line 33—33 of FIGURE 6, showing the recording head elevating mechanism.

The elevating mechanism comprises a lever 330 (FIG. 7) pivoted intermediate its ends to an upright bracket 331 by a pivot screw 332. Upright bracket 331 is secured to the upper side of main apparatus mounting plate 104 by a screw 333 (FIG. 6). At its forward end, lever 330 carries a roller 334 freely rotatably mounted on a laterally projecting pin 335. A helical tension spring 336 has its upper end connected to a fixed forwardly projecting pin 337 carried by upright bracket 331 and its lower end passes through a hole 338 formed near the upper edge of lever 330. Tension spring 336 urges lever 330 to rotate about pivot screw 332 in a counterclockwise direction as viewed in FIGURE 7, thereby maintaining roller 334 in engagement with the underside of recording head carriage floor member 252.

The rear end of lever 330 terminates in an arcuate sector 339 which has ratchet teeth 340 formed on the periphery thereof. The pointed end 341 of a pawl 342 is engageable with ratchet teeth 340 in response to the energization of a carriage elevating electromagnet 343 (FIG. 6). The elevating electromagnet 343 comprises an armature 344 connected to its frame 345 by hinge members 346. Adjacent to its hinged edge, armature 344 has a downwardly extending bracket 347 (FIG. 5) fixed thereto. A backstop screw 348 is threaded through bracket 347 and its end engages the frame 345 of electromagnet 343 at 349, limiting counterclockwise rotation of armature 344 as viewed in FIGURE 5. A helical retractile tension spring 350 has its upper end connected to a projection 351 of bracket 347 and its lower end connected to a fixed headed pin 352 carried by the frame 345 of electromagnet 343. Tension spring 350 yieldingly urges rotation of armature 344 on hinges 346 in a counterclockwise direction as viewed in FIGURE 5, this rotation being limited by backstop screw 348, as noted above.

At its outer end, armature 344 has a bracket 353 (FIG. 6) fixed thereto by screws 354. Bracket 353 comprises an outer downwardly extending portion 355 (FIG. 7) cut away at 356 to receive pawl 342. Pawl 342 is pivoted to downwardly extending portion 355 of bracket 353 by a pivot pin 357. Pawl 342 is urged to rotate on a pivot pin 356 in a counterclockwise direction as viewed in FIGURE 7, by a leaf spring 358. In the deenergized condition of elevating electromagnet 343, pawl 342 is held displaced in a clockwise direction by fixed projecting pin 359 carried by the frame 345 of electromagnet 343, the pin 359 engaging a projection 360 provided on pawl 342 for this purpose. Being thus held displaced, the end 341 of pawl 342 will not interfere with the upward movement of ratchet teeth 340 which accompanies actuation of the carriage lowering mechanism. A cover member 361 (FIG. 6) holds pawl 342 against longitudinal movement on pivot pin 357.

When elevating electromagnet 343 is energized, pivot pin 356 moves downwardly with the outer end of armature 344 and frees pawl 342 from engagement with fixed pin 359, permitting it to rotate on its pivot pin 357 in a clockwise direction so that its pointed end 341 may engage one of the ratchet teeth 340 on arcuate sector 339, forcing the tooth downwardly for rotation of lever 330 in a counterclockwise direction on pivot screw 332 as viewed in FIGURE 7. This counterclockwise rotation of lever 330 raises roller 334 which accordingly elevates recording head carriage 256. The pawl 342 moved downwardly through a distance sufficient to displace any one of the teeth 340 of arcuate sector 339 through a distance slightly greater than the distance required to raise carriage 256 by the height of one of the vertical sides 274 and 275 of the steps of step members 267 and 268. Upon the carriage 256 being thus raised, the tension spring 287 acting through lever 321 urges control bar 273 to the right as viewed in FIGURE 4, this movement being limited by engagement of the vertical sides 274 and 275 of the steps of step members 267 and 268 with the projecting pins 265 and 266 of carriage 256. For a downward movement of one tooth of the arcuate sector 339, the carriage 256 will be elevated by one step, corresponding to one line of recording area of magnetic tape.

The recording head carriage may thus be lowered by one line at a time by successive actuations of electromagnet 299, or may be elevated by one line at a time by successive actuations of electromagnet 343.

Figures 14, 15:
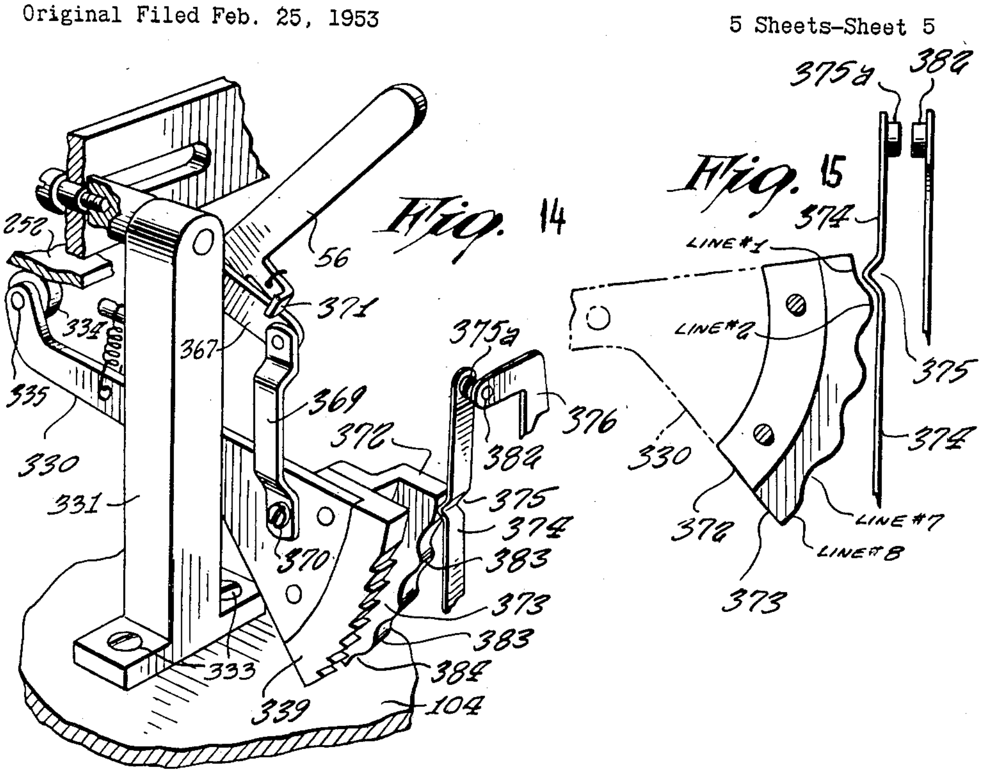
FIGURE 14 is an enlarged perspective view of a detail showing the directional control contact mechanism which operates in conjunction with the recording head carriage elevating and lowering mechanism.
FIGURE 15 is an enlarged side view showing the directional control contacts and the control cam therefor illustrated in FIGURE 14.

Manually operable means are also provided for elevating the recording head carriage 256. The manually operable recording head carriage elevating lever 56 is pivoted near its lower end to a pivot pin 362 (FIG. 7) fixed to the upright bracket 331. A helical torsion spring 363 is mounted on pivot pin 362 and one end engages a hole 364 formed in a projecting arm portion 365 of lever 56, the other end of torsion spring 363 engaging a hole 366 formed in upright bracket 331. Torsion spring 363 yieldingly urges lever 56 in a counterclockwise direction about pivot pin 362 as viewed in FIGURE 7. A lever 367 has one end pivoted to upright bracket 331 by pivot pin 362 and the other end pivotally connected at 368 to the upper end of a link member 369. The lower end of link member 369 is pivoted to lever 330 at 360. The end of arm portion 365 of lever 56 is formed with a lateral projection 371 (FIG. 14) arranged for engagement with lever 367 upon counterclockwise rotation of lever 56 as viewed in FIGURE 6 or clockwise rotation as viewed in FIGURE 14, to force link member 369 downwardly. This movement elevates roller 334 and recording head carriage 256, which remains in the elevated position by movement of step members 267 and 268 to the right as viewed in FIGURE 1 under the influence of tension spring 287.

Clockwise rotation of lever 56, merely disengages lateral projection 371 from contact with the upper surface of lever 367 and has no other effect whatever upon the carriage elevating mechanism.

Disposed on lever 330 and extending parallel to arcuate sector 339 (FIGS. 14 and 15), is an arcuately shaped cam member 372 formed with an undulatory peripheral cam surface 373. An upright leaf spring type contact member 374 is formed with projecting portion 375 therein which acts as a cam follower and engages the undulatory cam surface 373.

The leaf spring 374 is provided adjacent to its upper end with a movable contact 375*a*. A follower portion 375 of leaf spring member 374 is disposed in radial alignment with a valley portion 384 of undulatory cam surface 373, the spring action of leaf spring member 374 causes the contacts 375*a* and 382 to move apart into circuit opening relationship.

While I have shown what I believe to be the best embodiments of my invention, I do not wish, however, to be confined to the embodiments shown, but what I desire to cover by Letters Patent is set forth in the appended claims.

What is claimed is:

1. A carriage device for the linear displacement of a movable member carried thereby, comprising: a pair of fixedly positioned spaced parallel guide members; supporting means for said movable member engaging said guide members for movement therealong; a pair of spaced protruding members carried by said supporting means for movement therewith, said protruding members extending perpendicularly with respect to said guide members; a pair of step members fixedly positioned with respect to each other and movable together in a direction perpendicular to said guide members and parallel to the plane of the directions of said guide members, each of said step members having a plurality of similar spaced two-surfaced rectangular steps formed therein, a first surface of each step being perpendicular to the direction of said guide members and a second surface of each step being parallel to the directions of both said protruding members and said guide members, the spacing between said second surfaces of corresponding steps on each of said step members being equal to said spacing between said protruding members, and the spacing between adjacent first surfaces on each step member being the same for corresponding steps of both step members for providing predetermined increments of travel for said supporting member by successive engagements between said protruding members and said first surfaces of corresponding steps of both step members; and means for producing relative movement between said step members and said protruding members.

2. A carriage device according to claim 1, further comprising force producing means acting on said supporting means for yieldingly urging said protruding members into simultaneous engagement with said first surfaces of corresponding steps of said step members, said movement producing means being arranged to urge said second surfaces of said corresponding steps away from said protruding members, whereby said protruding members may be urged by said force producing means abruptly into engagement with the first surfaces of corresponding steps adjacent to said first named corresponding steps.

3. A carriage device according to claim 2, wherein said movement producing means comprises electromechanical means including ratchet means for causing displacement of said step members through a distance at least equal to the distance between the second surfaces of corresponding adjacent steps whereby successive actuations of said electromechanical means causes said protruding members successively to engage first surfaces of corresponding adjacent steps.

4. A carriage device according to claim 2, further comprising an additional independent force producing means acting on said step members for yieldingly urging the second surfaces of corresponding steps thereof into engagement with said protruding members.

5. A carriage device according to claim 4 in which said movement producing means further comprises independently operable means for moving said supporting means against the yielding action of said first named force producing means, whereby said protruding members will be moved away from engagement with said first surfaces by a distance sufficient to permit said additional force producing means to urge the second surfaces of adjacent corresponding steps of said step members abruptly into engagement with said protruding members.

6. A carriage device according to claim 5, wherein said independently operable means comprises electromechanical means including ratchet means for causing displacement of said step members through a distance at least equal to the distance between first surfaces of corresponding adjacent steps, whereby successive actuations of said last named electromechanical means causes said protruding members successively to engage both surfaces of corresponding adjacent steps.

References Cited in the file of this patent

UNITED STATES PATENTS

| | | |
|---|---|---|
| 2,123,978 | Wagner | July 19, 1938 |
| 2,555,671 | Baia | June 5, 1951 |
| 2,684,739 | Hasbrouck | July 27, 1954 |
| 2,726,049 | Crain | Dec. 6, 1955 |
| 2,758,688 | Pepper | Aug. 14, 1956 |
| 2,800,808 | Cappelle et al. | July 30, 1957 |
| 2,822,426 | Dinsmore | Feb. 4, 1958 |
| 2,826,093 | Draper | Mar. 11, 1958 |
| 2,864,891 | Kabler | Dec. 16, 1958 |